United States Patent
Jian Jun et al.

(10) Patent No.: US 11,820,901 B2
(45) Date of Patent: Nov. 21, 2023

(54) PLATE-LIKE ALUMINA PARTICLE AND A MANUFACTURING METHOD FOR THE SAME

(71) Applicant: DIC Corporation, Tokyo (JP)

(72) Inventors: Yuan Jian Jun, Sakura (JP); Hiroshi Kinoshita, Sakura (JP)

(73) Assignee: DIC Corporation, Tokyo (JP)

(*) Notice: Subject to any disclaimer, the term of this patent is extended or adjusted under 35 U.S.C. 154(b) by 571 days.

(21) Appl. No.: 17/021,471

(22) Filed: Sep. 15, 2020

(65) Prior Publication Data

US 2021/0009812 A1   Jan. 14, 2021

Related U.S. Application Data

(62) Division of application No. 15/842,937, filed on Dec. 15, 2017, now Pat. No. 10,808,131.

(51) Int. Cl.
*C09C 1/40* (2006.01)
*C09K 5/14* (2006.01)
(Continued)

(52) U.S. Cl.
CPC .......... *C09C 1/407* (2013.01); *C04B 35/111* (2013.01); *C04B 35/117* (2013.01);
(Continued)

(58) Field of Classification Search
CPC ..... C09C 1/407; C09C 1/0018; C04B 35/111; C04B 35/117; C04B 35/62665;
(Continued)

(56) References Cited

U.S. PATENT DOCUMENTS

| 5,296,085 A | ‡ | 3/1994 | Faure | C01F 7/02 |
| | | | | 117/78 |
| 2014/0322534 A1‡ | | 10/2014 | Suzuki | C01F 7/441 |
| | | | | 428/40 |

(Continued)

FOREIGN PATENT DOCUMENTS

| JP | 2003-192338 A | ‡ | 7/2003 |
| JP | 2003-192338 A | | 7/2003 |

(Continued)

*Primary Examiner* — James A Fiorito
(74) *Attorney, Agent, or Firm* — Locke Lord LLP; James E. Armstrong, IV; Nicholas J. DiCeglie, Jr.

(57) ABSTRACT

[Object] An object of the present invention is to provide a high-aspect-ratio plate-like alumina particle having low aggregability and high dispersibility and a method for producing the particle.
[Solving Means] The above problem is solved by providing a plate-like alumina particle including a step of firing an aluminum compound in the presence of a shape-controlling agent and a molybdenum compound serving as a fluxing agent. The above problem is solved also by providing a method for producing a plate-like alumina particle, the method including a step in which the aluminum compound and the molybdenum compound react with each other to form aluminum molybdate and a step in which the aluminum molybdate is decomposed to obtain the plate-like alumina particle.

13 Claims, 3 Drawing Sheets

(51) Int. Cl.
    *C10M 103/06*     (2006.01)
    *C04B 35/117*     (2006.01)
    *C04B 35/63*     (2006.01)
    *C04B 35/626*     (2006.01)
    *C09C 1/00*     (2006.01)
    *C04B 35/111*     (2006.01)
    *C04B 35/653*     (2006.01)
    *C09K 3/14*     (2006.01)
    *C10N 10/06*     (2006.01)
    *C10N 10/12*     (2006.01)
    *C10N 20/06*     (2006.01)

(52) U.S. Cl.
    CPC .... *C04B 35/62665* (2013.01); *C04B 35/6303* (2013.01); *C04B 35/653* (2013.01); *C09C 1/0018* (2013.01); *C09K 5/14* (2013.01); *C10M 103/06* (2013.01); *C01P 2002/52* (2013.01); *C01P 2002/54* (2013.01); *C01P 2004/54* (2013.01); *C04B 2235/3201* (2013.01); *C04B 2235/3217* (2013.01); *C04B 2235/3218* (2013.01); *C04B 2235/3256* (2013.01); *C04B 2235/3418* (2013.01); *C04B 2235/5292* (2013.01); *C04B 2235/5296* (2013.01); *C04B 2235/5436* (2013.01); *C04B 2235/80* (2013.01); *C09C 2200/1004* (2013.01); *C09K 3/1436* (2013.01); *C10M 2201/05* (2013.01); *C10M 2201/062* (2013.01); *C10M 2201/0623* (2013.01); *C10N 2010/06* (2013.01); *C10N 2010/12* (2013.01); *C10N 2020/06* (2013.01)

(58) Field of Classification Search
    CPC ..... C04B 35/6303; C04B 35/653; C09K 5/14; C10M 103/06
    See application file for complete search history.

(56) References Cited

U.S. PATENT DOCUMENTS

| | | | | |
|---|---|---|---|---|
| 2014/0322536 | A1‡ | 10/2014 | Suzuki | C01F 7/02 428/40 |
| 2016/0264832 | A1‡ | 9/2016 | Yuan | C09K 5/14 |

FOREIGN PATENT DOCUMENTS

| | | | | |
|---|---|---|---|---|
| JP | 2009-035430 | A | ‡ | 2/2009 |
| JP | 2009-035430 | A | | 2/2009 |
| JP | 2016222501 | | ‡ | 12/2016 |
| JP | 2016222501 | A | | 12/2016 |
| WO | WO-2015060125 | A1 | * 4/2015 | ............. C01F 7/021 |

\* cited by examiner
‡ imported from a related application

PLATE-LIKE ALUMINA PARTICLE AND A MANUFACTURING METHOD FOR THE SAME

CROSS REFERENCE TO RELATED APPLICATIONS

This Application is a Divisional of U.S. patent application Ser. No. 15/842,937 filed on Dec. 15, 2017. The entire contents of this application are incorporated herein by reference in their entirety.

DETAILED DESCRIPTION OF THE INVENTION

Technical Field

The present invention relates to a plate-like alumina particle that has a high aspect ratio and a plate-like shape and that includes molybdenum in the particle, and a method for producing the particle.

Background Art

Alumina particles, which are inorganic fillers, are used in various applications. In particular, plate-like alumina particles are used in wide fields including thermally conductive fillers, high-brightness pigments, cosmetic materials, abrasives, conductive powder substrates, and lubricants for resin films, and, in particular, there is a need for high-aspect-ratio plate-like alumina particles having low aggregability and high dispersion.

As methods for producing plate-like alumina particles, various methods are conventionally known. For example, in PTL 1, a method in which a mineralizer such as aluminum fluoride is added in the step of calcining raw materials is known. As a method for producing an alumina particle by hydrothermal synthesis, a method described in PTL 2 is known, for example. However, these methods have difficulties in controlling particle sizes and, in particular, producing a high-aspect-ratio plate-like alumina. In addition, the methods suffer from aggregation problems: for example, multiple plate-like alumina particles obtained may be superposed on one another, and twin crystals may be formed.

In recent years, there have been various reports on the production of plate-like alumina particles having controlled sizes, shapes, etc. For example, PTL 3 discloses a method for producing a plate-like alumina particle having a diameter of 0.2 to 15 µm and an aspect ratio of 15 to 50 by using phosphate anion as a shape-controlling agent and by hydrothermal conditionalization at 350° C. or higher and a pressure of 50 to 200 atmospheres. Such an aspect ratio may fail to provide a function sufficient for applications such as cosmetic materials and high-brightness pigments, and the hydrothermal method disadvantageously requires a high temperature and a high pressure or a special apparatus and results in a high production cost.

PTL 4 reports a zinc-oxide-containing plate-like α-alumina particle having a thickness of 0.1 to 0.5 µm, an average particle size of 15 to 25 µm, and an aspect ratio of 50 to 250 by using zinc oxide as a crystal-controlling agent and performing firing at a temperature of 1000° C. or higher in the presence of a sulfate serving as a high-temperature fusing agent. The resulting plate-like alumina particle shows a high aspect and thus has excellent properties as an iridescent pigment. However, plate-like aluminas obtained by this method tend to aggregate, and, for example, it is necessary to disaggregate the aggregate by stirring at a temperature of 60° C. for 48 hours in a 0.5% sulfuric acid solution after the sulfate serving as a fusing agent is removed after the firing. In addition, since a large amount of sulfate is used as a fusing agent, and a fired product after the firing cannot be easily taken out of a firing chamber in the form of solid powder, the method is disadvantageously difficult to put into industrial use.

CITATION LIST

Patent Literature

PTL 1: Japanese Examined Patent Application Publication No. 35-6977
PTL 2: Japanese Examined Patent Application Publication No. 37-7750
PTL 3: Japanese Unexamined Patent Application Publication No. 9-59018
PTL 4: Japanese Patent No. 4825264

SUMMARY OF INVENTION

Problems to be Solved by the Invention

It is an object of the present invention to provide a high-aspect-ratio plate-like alumina particle having low aggregability and high dispersibility and a method for producing the particle.

Means for Solving the Problems

To solve the above problems, the inventors conducted intensive studies to discover that a plate-like alumina particle that has a polygonal plate-like particle shape, a thickness of 0.01 to 5 µm, an average particle size of 0.1 to 500 µm, and an aspect ratio, which is a ratio of particle size to thickness, of 2 to 500 and includes molybdenum in the particle is obtained by firing an aluminum compound in the presence of a molybdenum compound and a shape-controlling agent, thereby completing the present invention.

Thus, the present invention provides a plate-like alumina particle including a step of firing an aluminum compound in the presence of a molybdenum compound serving as a fluxing agent by using, as a shape-controlling agent, a compound including silicon or a silicon atom or a compound including sodium or a sodium atom.

The present invention also provides a method for producing a plate-like alumina particle, the method including a step in which the aluminum compound and the molybdenum compound react with each other to form aluminum molybdate and a step in which the aluminum molybdate is decomposed to obtain the plate-like alumina particle.

The present invention also provides a method for producing a plate-like alumina particle, wherein the molar ratio of molybdenum atoms in the molybdenum compound to aluminum atoms in the aluminum compound is in the range of molybdenum/aluminum=0.01 to 3.0.

Advantages

According to the present invention, a plate-like alumina particle having high dispersibility and a high aspect ratio and including molybdenum in the particle can be obtained. When the plate-like alumina particle is used as a thermally conductive filler, a high-brightness pigment, a cosmetic material, an abrasive, a conductive powder substrate, or a lubricant for a resin film, a maximum effect can be produced.

By regulating the mixing ratio of the aluminum compound used as a precursor to the molybdenum compound to the shape-controlling agent, the type of the shape-controlling agent, how the shape-controlling agent is added, etc., a plate-like alumina particle having a controlled average particle size, thickness, aspect ratio, etc. can be obtained, and, in particular, a plate-like alumina particle having a high aspect ratio can be obtained. Furthermore, the use of the molybdenum compound as a fluxing agent provides a plate-like alumina particle that is an alumina including molybdenum in the particle, is automorphic, and has excellent dispersibility.

The production method of the present invention is a convenient process that only includes firing solid powders. The method is a convenient production method that does not involve the elimination of solvent or waste liquid, expensive equipment, a complicated process, a post-treatment, etc. and imposes no burden on the environment.

Standard alumina has insufficient dispersibility because its zeta potential isoelectric point is neutral. However, the plate-like alumina obtained by the present invention has excellent dispersibility because its zeta potential isoelectric point is shifted to the acidic side as compared to that of standard alumina by the inclusion of molybdenum.

BEST MODE FOR CARRYING OUT THE INVENTION

Figure 1:
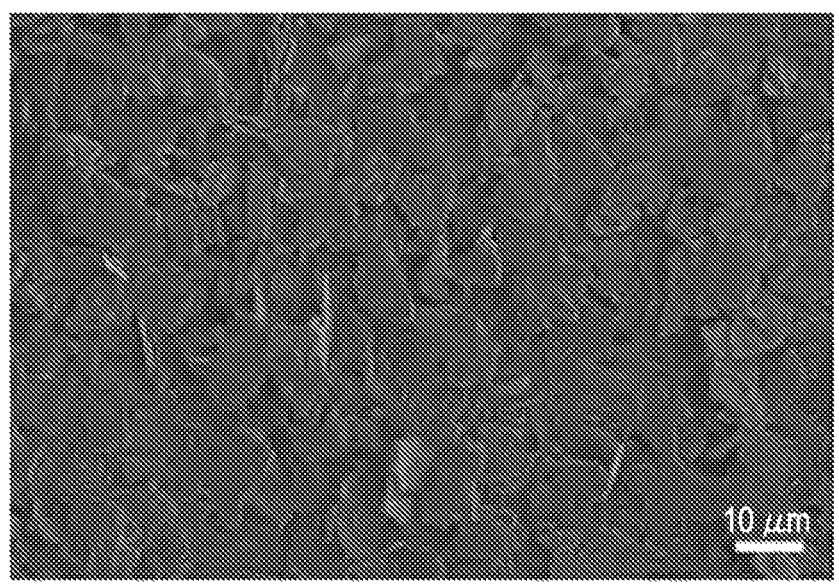
FIG. 1 is a scanning electron micrograph of a plate-like alumina particle obtained in Example 1.

An embodiment of the present invention will now be described in detail.
<Plate-Like Alumina Particle>
A plate-like alumina particle according to the embodiment includes molybdenum in the particle and has a polygonal plate-like shape. The plate-like alumina particle may include impurities, for example, from raw materials or a shape-controlling agent as long as the effect of the present invention is not adversely affected. The plate-like alumina particle may further include an organic compound, for example.

"Plate-like" as used herein means that an aspect ratio obtained by dividing an average particle size by a thickness is 2 or more. In the present description, "the thickness of the plate-like alumina particle" is a value determined using a scanning electron microscope (SEM). "The particle size of the plate-like alumina particle" means an arithmetic average of a maximum length and a minimum length among distances between any two points on the outline of the plate, and as a value of the particle size, a value determined using a scanning electron microscope (SEM) is used. A value of "the average particle size" means a value obtained by measuring the particle size of randomly selected 100 plate-like alumina particles in an image obtained using a scanning electron microscope (SEM) and making a calculation.

The plate-like alumina particle preferably has a thickness of 0.01 to 5 µm, an average particle size of 0.1 to 500 µm, and an aspect ratio, which is a ratio of particle size to thickness, of 2 to 500. This is because a plate-like alumina particle having an aspect ratio of 2 or more may advantageously have two-dimensional mixing properties and a plate-like alumina particle having an aspect ratio of 500 or less has excellent mechanical strength. More preferably, the thickness is 0.03 to 3 µm, the average particle size is 0.5 to 100 µm, and the aspect ratio, which is a ratio of particle size to thickness, is 10 to 300. A plate-like alumina particle having an aspect ratio of 10 to 300, when used as a pigment, advantageously shows high brightness.

The thickness, the average particle size, the aspect ratio, etc. of the plate-like alumina particle of the present invention can be controlled by selecting the proportion of a molybdenum compound, an aluminum compound, and a shape-controlling agent used, the type of the shape-controlling agent, and the state of existence of the shape-controlling agent and the aluminum compound.

The plate-like alumina particle according to the present invention may be obtained by any production method as long as molybdenum is contained in the particle, but to achieve a higher aspect ratio, more excellent dispersibility, and more excellent productivity, the particle is preferably obtained by firing an aluminum compound in the presence of a molybdenum compound and a shape-controlling agent. That is, the plate-like alumina particle according to the present invention is more readily obtained in such a manner that a molybdenum compound reacts with an aluminum compound at a high temperature to form aluminum molybdate, the aluminum molybdate is then further decomposed into alumina and molybdenum oxide at a higher temperature, during which time the molybdenum compound is taken into the plate-like alumina particle. The molybdenum oxide sublimes and can be recovered for reuse. Hereinafter, this production method is referred to as a flux method. The flux method will be described in detail later.

The shape-controlling agent plays an important role in plate-like crystal growth. In a commonly used molybdenum oxide flux method, molybdenum oxide is selectively adsorbed on the [113] plane of an α-crystal of alumina, and this impedes the supply of crystalline components to the [113] plane and can completely suppress the formation of the [001] plane, thus resulting in the formation of a polyhedral particle based on a hexagonal bipyramidal shape. In the present invention, the selective adsorption of molybdenum oxide, which serves as a fluxing agent, on the [113] plane is suppressed by using the shape-controlling agent, whereby a plate-like morphology having a thermodynamically most stable close-packed hexagonal lattice crystal structure in which the [001] plane is developed can be formed. By using the molybdenum compound as a fluxing agent, a molybdenum-containing plate-like alumina particle having a high α-crystallization rate, particularly, an α-crystallization rate of 90% or more can be more readily formed.

Through the use of molybdenum, the above-described plate-like alumina particle has a high α-crystallization rate and is automorphic, and thus can achieve excellent dispersibility and mechanical strength and high thermal conductivity.

In addition, the plate-like alumina particle of the present invention has excellent dispersibility because its zeta potential isoelectric point is shifted to the acidic side as compared to that of standard alumina by the inclusion of molybdenum.

In addition, the characteristics of molybdenum included in the plate-like alumina particle enable use in oxidation reaction catalyst applications and optical material applications.

[Alumina]

The "alumina" according to the present invention is an aluminum oxide and is not particularly limited as long as molybdenum is included in the particle. For example, the alumina may be a transition alumina in any crystal form such as γ, δ, θ, κ, or δ form, or alumina hydrate may be included in the transition alumina, but basically, the alumina is preferably in α-crystal form in order to achieve more excellent mechanical strength or thermal conductivity.

[Molybdenum]

Molybdenum has a catalytic function and an optical function. Through the use of molybdenum, a plate-like alumina particle having a high aspect ratio and excellent dispersibility can be produced by the production method described below.

Examples of the molybdenum include, but are not limited to, molybdenum metals, molybdenum oxides, and partially reduced molybdenum compounds.

The molybdenum may be contained in any manner: it may be included through attachment to the surface of the plate-like alumina particle, replacement with part of aluminum in the crystal structure of the alumina, or the combination thereof.

The molybdenum content of the plate-like alumina particle of the present invention is preferably 10% by mass or less on a molybdenum trioxide basis, and by adjusting the firing temperature, the firing time, and the sublimation rate of the molybdenum compound, the molybdenum content is more preferably 0.001% to 8% by mass, still more preferably 0.01% to 5% by mass. A molybdenum content of 10% by mass or less advantageously improves the α-single-crystal quality of the alumina.

[Organic Compound]

In one embodiment, the plate-like alumina particle may include an organic compound. The organic compound is present on the surface of the plate-like alumina particle and has a function to regulate the surface physical properties of the plate-like alumina particle. For example, the plate-like alumina particle including the organic compound on its surface improves the affinity for resins and thus can maximally express the function of the plate-like alumina particle as a filler.

Examples of the organic compound include, but are not limited to, organic silanes, phosphonic acids, and polymers.

Examples of the organic silanes include alkyltrimethoxysilanes having alkyl groups of 1 to 22 carbon atoms, such as methyltrimethoxysilane, dimethyldimethoxysilane, ethyltrimethoxysilane, ethyltriethoxysilane, n-propyltrimethoxysilane, n-propyltriethoxysilane, iso-propyltrimethoxysilane, iso-propyltriethoxysilane, pentyltrimethoxysilane, and hexyltrimethoxysilane, or alkyltrichlorosilanes; 3,3,3-trifluoropropyltrimethoxysilane, tridecafluoro-1,1,2,2-tetrahydrooctyl)trichlorosilane, phenyltrimethoxysilane, phenyltriethoxysilane, p-chloromethylphenyltrimethoxysilane, and p-chloromethylphenyltriethoxysilane.

Examples of the phosphonic acids include methylphosphonic acid, ethylphosphonic acid, propylphosphonic acid, butylphosphonic acid, pentylphosphonic acid, hexylphosphonic acid, heptylphosphonic acid, octylphosphonic acid, decylphosphonic acid, dodecylphosphonic acid, octadecylphosphonic acid, 2-ethylhexylphosphonic acid, cyclohexylmethylphosphonic acid, cyclohexylethylphosphonic acid, benzylphosphonic acid, phenylphosphonic acid, and dodecylbenzenesulfonic acid.

As the polymers, poly(meth)acrylates are suitable for use, for example. Specific examples include polymethyl (meth)acrylate, polyethyl (meth)acrylate, polybutyl (meth)acrylate, polybenzyl (meth)acrylate, polycyclohexyl (meth)acrylate, poly t-butyl (meth)acrylate, polyglycidyl (meth)acrylate, polypentafluoropropyl (meth)acrylate, and common polymers such as polystyrene, polyvinyl chloride, polyvinyl acetate, epoxy resins, polyester, polyimide, and polycarbonate.

The organic compounds listed above may be included alone or in a combination of two or more.

The organic compound may be contained in any manner: it may be linked with the alumina via a covalent bond or may cover the alumina.

The organic compound content is preferably 20% by mass or less, more preferably 10% to 0.01% by mass, relative to the mass of the plate-like alumina particle. An organic compound content of 20% by mass or less advantageously facilitates the expression of physical properties derived from the plate-like alumina particle.

<Method for Producing Plate-Like Alumina Particle>

The method is producing a plate-like alumina particle is not particularly limited, and a known technique may be appropriately used. Preferably, a production method by a flux method using a molybdenum compound may be used since an alumina having a high α-crystallization rate can be suitably controlled at a relatively low temperature.

More particularly, a preferred method for producing a plate-like alumina particle includes a step of firing an aluminum compound in the presence of a molybdenum compound and a shape-controlling agent.

[Firing Step]

The firing step is a step of firing an aluminum compound in the presence of a molybdenum compound and a shape-controlling agent.

(Aluminum Compound)

The aluminum compound in the present invention is a raw material for the plate-like alumina particle of the present invention and is not particularly limited as long as it is converted into an alumina by heat treatment. For example, aluminum chloride, aluminum sulfate, basic aluminum acetate, aluminum hydroxide, boehmite, pseudoboehmite, transition aluminas (e.g., γ-alumina, δ-alumina, and θ-alumina), α-alumina, mixed aluminas having two or more crystal phases, and the like can be used, and physical forms of these aluminum compounds serving as precursors, such as shape, particle size, and specific surface area, are not particularly limited.

According to the flux method described in detail below, the shape of the plate-like alumina particle of the present invention does not substantially reflect the shape of the aluminum compound used as a raw material. Therefore, for example, any of spheres, amorphous bodies, structures having aspects (e.g., wires, fibers, ribbons, and tubes), sheets, etc. is suitable for use.

Similarly, according to the flux method described in detail below, the plate-like alumina particle of the present invention does not substantially reflect the particle size of the aluminum compound. Therefore, solid aluminum compounds of from several nanometers to several hundred micrometers are suitable for use.

The specific surface area of the aluminum compound is also not particularly limited. The specific surface area is preferably larger in order for the molybdenum compound to effectively act, but by adjusting firing conditions and the amount of the molybdenum compound used, aluminum compounds having any specific surface area can be used as raw materials.

The aluminum compound may be made of an aluminum compound alone or may be a composite of an aluminum compound and an organic compound. For example, an organic/inorganic composite obtained by modifying an aluminum compound by using an organic silane, an aluminum compound composite having a polymer adsorbed thereon, etc. are also suitable for use. When such a composite is used, the organic compound content is not particularly limited, but the content is preferably 60% by mass or less, more preferably 30% by mass or less, since the plate-like alumina particle can be efficiently produced.

(Shape-Controlling Agent)

To form the plate-like alumina particle of the present invention, it is essential to use a shape-controlling agent. The shape-controlling agent plays an important role in the plate-like crystal growth of alumina by firing an alumina compound in the presence of a molybdenum compound.

The state of existence of the shape-controlling agent is not particularly limited as long as it can come into contact with the aluminum compound. For example, a physical mixture of the shape-controlling agent and the aluminum compound, a composite in which the shape-controlling agent is uniformly or locally present on or in the aluminum compound, etc. are suitable for use.

The shape-controlling agent may be added to the aluminum compound or may be included as impurities in the aluminum compound.

The type of the shape-controlling agent is not particularly limited, provided that while performing high-temperature firing in the presence of a molybdenum compound, the selective adsorption of molybdenum oxide on the [113] plane of α-alumina can be suppressed to form a plate-like morphology. To achieve a higher aspect ratio, more excellent dispersibility, and more excellent productivity, it is preferable to use a metal compound other than the molybdenum compounds and aluminum compounds, and it is more preferable to use a compound including silicon or a silicon atom or a compound including sodium or a sodium atom.

The compound including silicon or a silicon atom is not particularly limited, and any known compound can be used. Specific examples of the compound including silicon or a silicon atom include artificial synthetic silicon compounds such as metallic silicon, organic silanes, silicone resins, silica fine particles, silica gels, mesoporous silicas, SiC, and mullite; and naturally occurring silicon compounds such as biosilica. Of these, organic silanes, silicone resins, and silica fine particles are suitable for use because they can be more uniformly compounded and mixed with the aluminum compound. These compounds including silicon or a silicon atom may be used alone or in a combination of two or more.

The shape of the compound including silicon or a silicon atom is not particularly limited, and, for example, spheres, amorphous bodies, structures having aspects (e.g., wires, fibers, ribbons, and tubes), sheets, etc. are suitable for use.

The compound including silicon or a silicon atom may be used in any amount but preferably in an amount of 0.0001 to 1 mole, more preferably in an amount of 0.001 to 0.5 mole, per mole of aluminum metal in the aluminum compound. When the compound including silicon or a silicon atom is used in an amount within this range, a plate-like alumina particle having a high aspect ratio and excellent dispersibility is advantageously readily obtained.

The compound including sodium or a sodium atom is not particularly limited, and any known compound can be used. Specific examples of the compound including sodium or a sodium atom include sodium carbonate, molybdenum sodium, sodium oxide, sodium sulfate, sodium hydroxide, sodium nitrate, sodium chloride, and metallic sodium. Of these, sodium carbonate, sodium molybdate, sodium oxide, and sodium sulfate are suitable for use in terms of industrial availability and handleability. These compounds including sodium or a sodium atom may be used alone or in a combination of two or more.

The shape of the compound including sodium or a sodium atom is not particularly limited, and, for example, spheres, amorphous bodies, structures having aspects (e.g., wires, fibers, ribbons, and tubes), sheets, etc. are suitable for use.

The compound including sodium or a sodium atom may be used in any amount but preferably in an amount of 0.0001 to 2 moles, more preferably in an amount of 0.001 to 1 mole, per mole of aluminum metal in the aluminum compound. When the compound including sodium or a sodium atom is used in an amount within this range, a plate-like alumina particle having a high aspect ratio and excellent dispersibility is advantageously readily obtained.

(Molybdenum Compound)

The molybdenum compound serves a flux function in α-crystal growth of alumina at a relatively low temperature as described below.

Examples of the molybdenum compound include, but are not limited to, molybdenum oxide and compounds containing an oxygen-containing anion ($MoO_x^{n-}$) formed by the bonding of molybdenum metal to oxygen.

Examples of the compounds containing an oxygen-containing anion ($MoO_x^{n-}$) include, but are not limited to, molybdenum acid, sodium molybdate, potassium molybdate, lithium molybdate, $H_3PMo_{12}O_{40}$, $H_3SiMO_{12}O_{40}$, $NH_4Mo_7O_{12}$, and molybdenum disulfide.

The molybdenum compound may include sodium or silicon. In this case, the molybdenum compound including sodium or silicon serves as both a fluxing agent and a shape-controlling agent.

Of the molybdenum compounds listed above, molybdenum oxide is suitable for use in terms of cost. The molybdenum compounds listed above may be used alone or in a combination of two or more.

The molybdenum compound may be used in any amount but preferably in an amount of 0.01 to 3.0 moles, more preferably in an amount of 0.03 to 0.7 mole, per mole of aluminum metal in the aluminum compound. When the molybdenum compound is used in an amount within this range, a plate-like alumina particle having a high aspect ratio and excellent dispersibility is advantageously readily obtained.

(Firing)

The plate-like alumina particle of the present invention is obtained, for example, by firing an aluminum compound in the presence of a molybdenum compound and a shape-controlling agent. As described above, this production method is called a flux method. When an aluminum compound is fired in the presence of a molybdenum compound, the molybdenum compound reacts with the aluminum compound at a high temperature to form aluminum molybdate, the aluminum molybdate is then further decomposed into alumina and molybdenum oxide at a higher temperature, and plate-like crystals of α-alumina are grown in the presence of a shape-controlling agent, whereby the plate-like alumina particle is readily obtained. The resulting plate-like alumina particle includes molybdenum in the particle and has a polygonal plate-like particle shape, a thickness of 0.01 to 5

μm, an average particle size of 0.1 to 500 μm, and an aspect ratio, which is a ratio of particle size to thickness, of 2 to 500.

The firing may be performed by any known conventional method. When a firing temperature is over 700° C., the aluminum compound and the molybdenum compound react with each other to form aluminum molybdate. When the firing temperature is further increased to 900° C. or higher, the aluminum molybdate is decomposed, and the plate-like alumina particle is formed under the action of the shape-controlling agent. The plate-like alumina particle is obtained in such a manner that the molybdenum compound is taken into an aluminum oxide particle when the aluminum molybdate is decomposed into alumina and molybdenum oxide.

During the firing, the aluminum compound, the shape-controlling agent, and the molybdenum compound may be in any state as long as the molybdenum compound and the shape-controlling agent are present in the same space where they can act on the aluminum compound. Specifically, powders of the molybdenum compound, the shape-controlling agent, and the aluminum compound may be mixed by convenient mixing, mechanical mixing using a crusher or the like, or mixing using a mortar or the like. The mixing may be performed in a dry state or a wet state.

The firing temperature conditions are not particularly limited and are appropriately selected according to the desired average particle size, aspect ratio, dispersibility, etc. of the plate-like alumina particle of the present invention. Typically, the firing temperature may be such that the maximum temperature is not lower than 900° C. which is a decomposition temperature of aluminum molybdate ($Al_2(MoO_4)_3$).

In general, when it is desired to control the shape of α-alumina that is obtained after the firing, it is necessary to perform high-temperature firing at 2000° C. or higher which is near the melting point of α-alumina, but the industrial use of such high-temperature firing is very problematic in terms of the burden on a firing furnace and the fuel cost.

Although the production method of the present invention may be implemented at a high temperature higher than 2000° C., a plate-like shaped α-alumina having a high α-crystallization rate and a high aspect ratio can be formed also at a temperature of 1600° C. or lower which is considerably lower than the melting point of α-alumina regardless of the shape of the precursor.

According to the present invention, a plate-like alumina particle having a high aspect ratio and an α-crystallization rate of 90% or more can be efficiently formed at low cost even under conditions where the maximum firing temperature is 900° C. to 1600° C. Firing at a maximum temperature of 950° C. to 1500° C. is more preferred, and firing at a maximum temperature in the range of 1000° C. to 1400° C. is most preferred.

The firing time is preferably such that the heat-up time to a predetermined maximum temperature is in the range of 15 minutes to 10 hours and the retention time at the maximum firing temperature is in the range of 5 minutes to 30 hours. To efficiently form the plate-like alumina particle, the firing retention time is more preferably about 10 minutes to 15 hours.

The firing may be performed in any atmosphere as long as the effects of the invention are produced, but, for example, oxygen-containing atmospheres such as air and oxygen and inert atmospheres such as nitrogen and argon are preferred, and the air atmosphere is more preferred in view of cost.

The apparatus for the firing is not necessarily limited, and what is called a firing furnace can be used. The firing furnace is preferably made of a material that does not react with sublimed molybdenum oxide, and to more efficiently utilize molybdenum oxide, it is preferable to use a highly hermetic firing furnace.

[Molybdenum Removal Step]

The method for producing a plate-like alumina particle may further include, after the firing step, a molybdenum removal step for removing at least part of molybdenum as required.

Since molybdenum sublimes during the firing as described above, the molybdenum content of the plate-like alumina particle can be controlled by controlling the firing time, the firing temperature, etc.

Molybdenum may adhere to the surface of the plate-like alumina particle. The molybdenum can be removed by washing with water, an aqueous ammonia solution, an aqueous sodium hydroxide solution, or an acidic aqueous solution.

In this case, the molybdenum content can be controlled by appropriately varying the concentration and amount of water, the aqueous ammonia solution, the aqueous sodium hydroxide solution, or the acidic aqueous solution used, the washing site, the washing time, etc.

[Organic-Compound-Layer Formation Step]

In one embodiment, the method for producing a plate-like alumina particle may further include an organic-compound-layer formation step. The organic-compound-layer formation step is typically carried out after the firing step or after the molybdenum removal step.

The organic compound layer may be formed by any method, and a known method may be appropriately used. One example is a method in which a liquid including an organic compound is brought into contact with a plate-like alumina particle including molybdenum and dried.

For the formation of the organic compound layer, the organic compounds listed above can be used.

EXAMPLES

The present invention will now be described in detail with reference to examples, but the present invention is not limited thereto. Unless otherwise specified, "%" means "% by mass".

[Shape Analysis of Plate-Like Alumina Particle with Scanning Electron Microscope]

A sample was fixed to a sample holder with double-sided tape and observed using a Keyence VE-9800 surface observer.

[Composition Analysis of Plate-Like Alumina Particle with Fluorescent X-Rays]

A sample of about 100 mg was placed on filter paper, and fluorescent X-ray analysis (ZSX100e available from Rigaku Corporation) was performed with a PP film put thereon.

[Analysis by X-Ray Diffraction (XRD)]

A sample prepared was placed on a measurement sample holder and put in a wide-angle X-ray diffractometer [Rint-Ultma available from Rigaku Corporation], and a measurement was made under the following conditions: Cu/Kα radiation; 40 kV/30 mA; scan speed, 1.0°/min; scan range, 5° to 80°.

[Firing Method]

The firing was performed using a firing furnace apparatus equipped with a model ARF-100K ceramic electric furnace and a model AMF-2P temperature controller available from Asahi Rika Seisakusho K.K.

[Measurement of Zeta Potential]

Measurement of zeta potential was performed using a Zetasizer Nano ZSP (Malvern).

A sample was diluted 3000-fold with pure water, and pH titration was then performed using 0.1 N HCl, 0.01 N HCl, and 0.1 N NaOH.

Example 1<Production of Plate-Like Alumina Particle>

Five grams of an activated alumina (available from Wako Pure Chemical Industries, Ltd: average particle size, 45 μm), 0.01 g of silica nanoparticles (KE-P10 available from Nippon Shokubai Co., Ltd: average particle size, 0.1 to 0.2 μm), and 5 g of molybdenum trioxide (available from Wako Pure Chemical Industries, Ltd.) were mixed using a mortar to obtain 10.01 g of a mixture. The mixture was placed in a crucible and fired in a ceramic electric furnace at 1100° C. for 3 hours. Most molybdenum oxide sublimed, and after the temperature was reduced, the crucible was taken out to obtain 5.1 g of blue powder.

Figure 2:
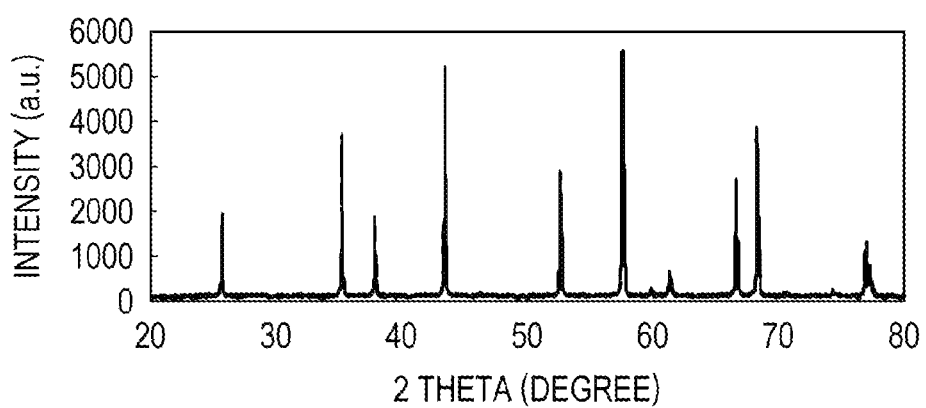
FIG. 2 is a powder XRD chart of the plate-like alumina particle obtained in Example 1.

SEM observation revealed that the powder had a polygonal shape, a thickness of 500 nm, an average particle size of 10 μm, and an aspect ratio of 20 (FIG. 1). In the SEM observation, no twin crystals or no aggregates of multiple plates superposed on one another were observed, demonstrating that the powder was a plate-like shaped particle suggesting excellent dispersibility. Furthermore, XRD measurement was performed; a sharp scattering peak attributed to α-alumina appeared, and no peaks attributed to alumina crystal systems other than the α-crystal structure were observed (FIG. 2). The results of fluorescent X-ray quantitative analysis revealed that the particle included 1.38% molybdenum on a molybdenum trioxide basis.

The blue powder in an amount of 4 g was dispersed in 4 mL of 10% aqueous ammonia, and the dispersion was stirred at room temperature (25° C. to 30° C.) for 3 hours, after which the aqueous ammonia was removed by filtration, and washing with water and drying were performed to remove molybdenum remaining on the particle surface, thereby obtaining 3.9 g of powder. Fluorescent X-ray quantitative evaluation of the powder revealed that the amount of molybdenum in the powder was 0.84% by mass on a molybdenum trioxide basis and that the particle was an alumina particle including molybdenum in the particle.

Measurement of zeta potential revealed that the alumina particle had an isoelectric point at pH 5.3.

Example 2<Production of Plate-Like Alumina Particle>

An experiment was performed in the same manner as in Example 1 except that the amount of silica nanoparticles used was changed to 0.5 g, thereby obtaining 5.4 g of blue powder. SEM observation revealed that the powder had a polygonal shape, a thickness of 250 nm, an average particle size of 8 μm, and an aspect ratio of 32. In the SEM observation, no twin crystals or no aggregates of multiple plates superposed on one another were observed, demonstrating that the powder was a plate-like shaped particle suggesting excellent dispersibility. Furthermore, XRD measurement was performed; a sharp scattering peak attributed to α-alumina appeared, and no peaks attributed to alumina crystal systems other than the α-crystal structure were observed. The results of fluorescent X-ray quantitative analysis revealed that the particle included 1.04% molybdenum on a molybdenum trioxide basis. After molybdenum remaining on the particle surface was removed in the same manner as in Example 1, fluorescent X-ray quantitative evaluation revealed that the amount of molybdenum was 0.93% by mass on a molybdenum trioxide basis and that the particle was an alumina particle including molybdenum in the particle.

Measurement of zeta potential revealed that the alumina particle had an isoelectric point at pH 5.5.

Example 3<Production of Plate-Like Alumina Particle>

Figure 3:
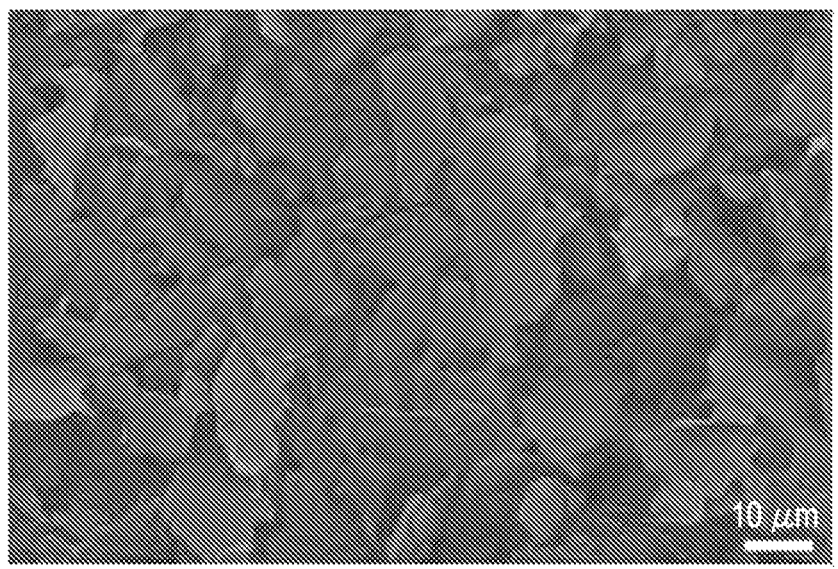
FIG. 3 is a scanning electron micrograph of a plate-like alumina particle obtained in Example 3.

An experiment was performed in the same manner as in Example 1 except that the amount of molybdenum trioxide used was changed to 1.25 g, thereby obtaining 5.0 g of blue powder. SEM observation revealed that the powder had a polygonal shape, a thickness of 250 nm, an average particle size of 20 μm, and an aspect ratio of 80 (FIG. 3). In the SEM observation, no twin crystals or no aggregates of multiple plates superposed on one another were observed, demonstrating that the powder was a plate-like shaped particle suggesting excellent dispersibility. Furthermore, XRD measurement was performed; a sharp scattering peak attributed to α-alumina appeared, and no peaks attributed to alumina crystal systems other than the α-crystal structure were observed. The results of fluorescent X-ray quantitative analysis revealed that the particle included 0.59% molybdenum on a molybdenum trioxide basis. After molybdenum remaining on the particle surface was removed in the same manner as in Example 1, fluorescent X-ray quantitative evaluation revealed that the amount of molybdenum was 0.50% by mass on a molybdenum trioxide basis and that the particle was an alumina particle including molybdenum in the particle.

Measurement of zeta potential revealed that the alumina particle had an isoelectric point at pH 5.4.

Example 4<Production of Plate-Like Alumina Particle>

Twenty grams of boehmite (available from Taimei Chemicals Co., Ltd: average particle size, 1 μm) containing 0.04% silicon and 2 g of molybdenum trioxide (available from Wako Pure Chemical Industries, Ltd.) were mixed using a mortar to obtain 25 g of a mixture. The mixture was placed in a crucible and fired in a ceramic electric furnace at 1100° C. for 10 hours. Most molybdenum oxide sublimed, and after the temperature was reduced, the crucible was taken out to obtain 17.0 g of blue powder.

Figure 4:
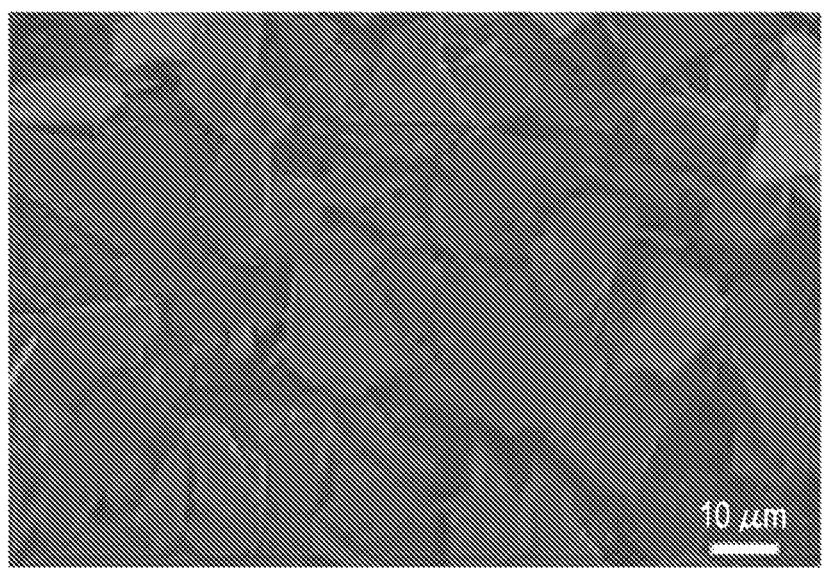
FIG. 4 is a scanning electron micrograph of a plate-like alumina particle obtained in Example 4.

SEM observation revealed that the powder had a polygonal shape, a thickness of 600 nm, an average particle size of 30 μm, and an aspect ratio of 50 (FIG. 4). In the SEM observation, no twin crystals or no aggregates of multiple plates superposed on one another were observed, demonstrating that the powder was a plate-like shaped particle suggesting excellent dispersibility. Furthermore, XRD measurement was performed; a sharp scattering peak attributed to α-alumina appeared, and no peaks attributed to alumina crystal systems other than the α-crystal structure were observed. The results of fluorescent X-ray quantitative analysis revealed that the particle included 0.50% molybdenum on a molybdenum trioxide basis. After molybdenum remaining on the particle surface was removed in the same manner as in Example 1, fluorescent X-ray quantitative evaluation revealed that the amount of molybdenum was 0.43% by mass on a molybdenum trioxide basis and that the particle was an alumina particle including molybdenum in the particle.

Measurement of zeta potential revealed that the alumina particle had an isoelectric point at pH 5.5.

Example 5<Production of Plate-Like Alumina Particle>

Twenty grams of aluminum hydroxide (available from Showa Denko K.K: average particle size, 0.9 μm) containing 0.31 wt % $Na_2O$ and 1.5 g of molybdenum trioxide (available from Wako Pure Chemical Industries, Ltd.) were mixed using a mortar to obtain 21.5 g of a mixture. The mixture was placed in a crucible and fired in a ceramic electric furnace at 1100° C. for 10 hours. Most molybdenum oxide sublimed, and after the temperature was reduced, the crucible was taken out to obtain 13 g of blue powder.

SEM observation revealed that the powder had a polygonal shape, a thickness of 1.5 μm, an average particle size of 3.5 μm, and an aspect ratio of 2.3. In the SEM observation, no twin crystals or no aggregates of multiple plates superposed on one another were observed, demonstrating that the powder was a plate-like shaped particle suggesting excellent dispersibility. Furthermore, XRD measurement was performed; a sharp scattering peak attributed to α-alumina appeared, and no peaks attributed to alumina crystal systems other than the α-crystal structure were observed. The results of fluorescent X-ray quantitative analysis revealed that the particle included 1.39% molybdenum on a molybdenum trioxide basis. After molybdenum remaining on the particle surface was removed in the same manner as in Example 1, fluorescent X-ray quantitative evaluation revealed that the amount of molybdenum was 0.90% by mass on a molybdenum trioxide basis and that the particle was an alumina particle including molybdenum in the particle.

Measurement of zeta potential revealed that the alumina particle had an isoelectric point at pH 5.6.

Example 6<Production of Plate-Like Alumina Particle>

Thirty grams of aluminum hydroxide (available from Showa Denko K.K: average particle size, 4.0 μm; $SiO_2$ content, 0.01% by weight) treated with acrylic silane and 19.5 g of molybdenum trioxide (available from Wako Pure Chemical Industries, Ltd.) were mixed using a mortar to obtain 49.5 g of a mixture. The mixture was placed in a crucible and fired in a ceramic electric furnace at 1100° C. for 10 hours. Most molybdenum oxide sublimed, and after the temperature was reduced, the crucible was taken out to obtain 19.3 g of blue powder.

Figure 5:
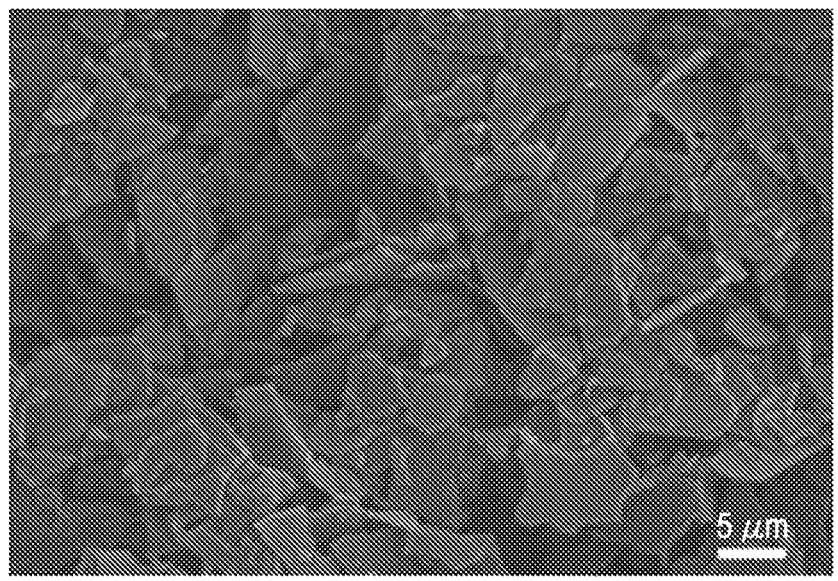
FIG. 5 is a scanning electron micrograph of a plate-like alumina particle obtained in Example 6.

SEM observation revealed that the powder had a thickness of 400 nm, an average particle size of 8 μm, and an aspect ratio of 20 (FIG. 5). In the SEM observation, no twin crystals or no aggregates of multiple plates superposed on one another were observed, demonstrating that the powder was a plate-like shaped particle suggesting excellent dispersibility. Furthermore, XRD measurement was performed; a sharp scattering peak attributed to α-alumina appeared, and no peaks attributed to alumina crystal systems other than the α-crystal structure were observed. The results of fluorescent X-ray quantitative analysis revealed that the particle included 0.66% molybdenum on a molybdenum trioxide basis. After molybdenum remaining on the particle surface was removed in the same manner as in Example 1, fluorescent X-ray quantitative evaluation revealed that the amount of molybdenum was 0.57% by mass on a molybdenum trioxide basis and that the particle was an alumina particle including molybdenum in the particle.

Measurement of zeta potential revealed that the alumina particle had an isoelectric point at pH 5.6.

Example 7<Production of Plate-Like Alumina Particle>

Four grams of aluminum hydroxide (available from Showa Denko K.K: average particle size, 1 μm), 0.5 g of sodium carbonate (available from Wako Pure Chemical Industries, Ltd.), and 1 g of molybdenum oxide (available from Wako Pure Chemical Industries, Ltd.) were mixed using a mortar to obtain 5.5 g of a mixture. The mixture was placed in a crucible and fired in a ceramic electric furnace at 1100° C. for 5 hours. After the temperature was reduced, the crucible was taken out, and washing with water was performed to obtain 2.1 g of powder.

Figure 6:
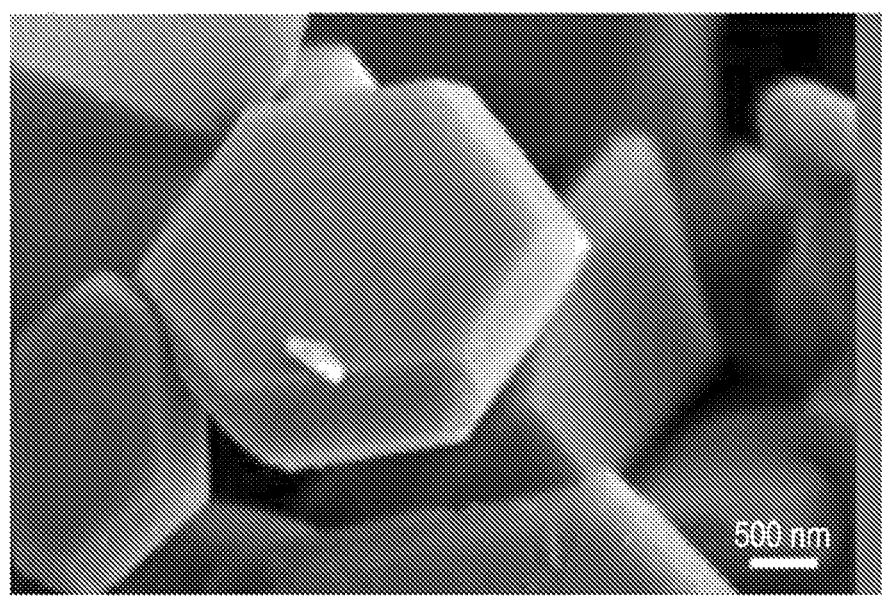
FIG. 6 is a scanning electron micrograph of a plate-like alumina particle obtained in Example 7.

SEM observation revealed that the powder included no aggregates and had a hexagonal plate-like shape, a thickness of 1.5 μm, an average particle size of 4 μm, and an aspect ratio of 2.7 (FIG. 6). Furthermore, XRD measurement was performed; a sharp scattering peak attributed to α-alumina appeared, and no peaks attributed to alumina crystal systems other than the α-crystal structure were observed. The results of fluorescent X-ray quantitative analysis revealed that the particle included 0.22% molybdenum on a molybdenum trioxide basis. Furthermore, after molybdenum remaining on the particle surface was removed in the same manner as in Example 1, fluorescent X-ray quantitative evaluation revealed that the amount of molybdenum was 0.2% by mass on a molybdenum trioxide basis and that the particle was an alumina particle including molybdenum in the particle.

Measurement of zeta potential revealed that the alumina particle had an isoelectric point at pH 5.5.

Example 8<Production of Plate-Like Alumina Particle>

An experiment was performed in the same manner as in Example 7 except that the amount of sodium carbonate used was changed to 1 g. After the temperature was reduced, the crucible was taken out, and washing with water was performed to obtain 2.6 g of powder. SEM observation revealed that the powder included no aggregates and had a thickness of 50 nm, an average particle size of 600 nm, and an aspect ratio of 12. Furthermore, XRD measurement was performed; a scattering peak attributed to a transition alumina as well as a scattering peak attributed to α-alumina appeared, demonstrating that an α-crystal structure and a transition alumina crystal structure coexisted. The results of fluorescent X-ray quantitative analysis revealed that the particle included 0.16% molybdenum on a molybdenum trioxide basis. Furthermore, after molybdenum remaining on the particle surface was removed in the same manner as in Example 1, fluorescent X-ray quantitative evaluation revealed that the amount of molybdenum was 0.15% by mass on a molybdenum trioxide basis and that the particle was an alumina particle including molybdenum in the particle.

Measurement of zeta potential revealed that the alumina particle had an isoelectric point at pH 5.4.

Example 9<Production of Plate-Like Alumina Particle>

Twenty grams of aluminum hydroxide (average particle size, <1 μm) and 6.5 g of sodium molybdate (available from Wako Pure Chemical Industries, Ltd.) were mixed using a mortar to obtain 26.5 g of a mixture. The mixture was placed in a crucible and fired in a ceramic electric furnace at 1100° C. for 10 hours. Most molybdenum oxide sublimed, and after the temperature was reduced, the crucible was taken out, and washing with water was performed to obtain 12.5 g of powder. SEM observation revealed that the powder was a plate-like shaped particle including no aggregates and having a thickness of 900 nm, an average particle size of 13 μm, and an aspect ratio of 14.4. Furthermore, after molybdenum remaining on the particle surface was removed in the same manner as in Example 1, fluorescent X-ray quantitative evaluation revealed that the amount of molybdenum was 0.2% by mass on a molybdenum trioxide basis and that the particle was an alumina particle including molybdenum in the particle.

Measurement of zeta potential revealed that the alumina particle had an isoelectric point at pH 5.7.

Comparative Example 1

An experiment was performed in the same manner as in Example 1 except that molybdenum trioxide was not used. After the temperature was reduced, the crucible was taken out to obtain 39 g of white powder. SEM observation revealed that the powder was an alumina particle having a shape with an amorphous particle size of 45 μm, which was the same as that of the precursor. Since molybdenum trioxide serving as a fluxing agent was not used, a plate-like alumina particle could not be formed.

Measurement of zeta potential revealed that the alumina particle had an isoelectric point at pH 7.4.

INDUSTRIAL APPLICABILITY

The plate-like alumina having a high aspect ratio according to the present invention is not aggregated and, moreover, has an isoelectric point shifted to the acidic side, and thus can have excellent dispersibility; therefore, the plate-like alumina is suitable for use as a thermally conductive filler, a cosmetic material, an abrasive, a high-brightness pigment, a lubricant material, a conductive powder substrate, a ceramic material, etc.

The invention claimed is:

1. A polygonal plate-like alumina particle, in which the [001] plane is developed, that includes molybdenum in the particle and having:
an aspect ratio obtained by dividing an average particle size by a thickness of 2 to 500,
a thickness of 0.01-5 μm,
and an average particle size of 0.1 to 500 μm.

2. A plate-like alumina particle, in which the [001] plane is developed, that includes molybdenum in the particle and having:
an aspect ratio obtained by dividing an average particle size by a thickness of 2 or more,
and a thickness of 0.01-5 μm.

3. The plate-like alumina particle according to claim 2, having a polygonal plate-like particle shape and an aspect ratio, which is a ratio of particle size to thickness, of 2 to 500.

4. The plate-like alumina particle according to claim 2, wherein a molybdenum content is 0.001% to 10% by mass on a molybdenum trioxide basis.

5. The plate-like alumina particle according to claim 2, having an average particle size of 0.1 to 500 μm.

6. The plate-like alumina particle according to claim 3, wherein a molybdenum content is 0.001% to 10% by mass on a molybdenum trioxide basis.

7. The plate-like alumina particle according to claim 5, wherein a molybdenum content is 0.001% to 10% by mass on a molybdenum trioxide basis.

8. The plate-like alumina particle according to claim 3, having an average particle size of 0.1 to 500 μm.

9. The plate-like alumina particle according to claim 6, having an average particle size of 0.1 to 500 μm.

10. The plate-like alumina particle according to claim 2, wherein the particle is obtained by firing an aluminum compound in the presence of a fluxing agent and in the presence of a shape-controlling agent,
wherein the shape-controlling agent is a compound including silicon, a silicon atom, a compound including sodium or a sodium atom;
and wherein the fluxing agent is a molybdenum compound.

11. The plate-like alumina particle according to claim 4, wherein the particle is obtained by firing an aluminum compound in the presence of a fluxing agent and in the presence of a shape-controlling agent,
wherein the shape-controlling agent is a compound including silicon, a silicon atom, a compound including sodium or a sodium atom;
and wherein the fluxing agent is a molybdenum compound.

12. The plate-like alumina particle according to claim 5, wherein the particle is obtained by firing an aluminum compound in the presence of a fluxing agent and in the presence of a shape-controlling agent,
wherein the shape-controlling agent is a compound including silicon, a silicon atom, a compound including sodium or a sodium atom;
and wherein the fluxing agent is a molybdenum compound.

13. A polygonal plate-like alumina particle that includes molybdenum in the particle and having an aspect ratio obtained by dividing an average particle size by a thickness of 2 to 500, a thickness of 0.01-5 μm, and an average particle size of 0.1 to 500 μm;
wherein the particle is obtained by firing an aluminum compound in the presence of a fluxing agent and in the presence of a shape-controlling agent,
wherein the shape-controlling agent is a compound including silicon, a silicon atom, a compound including sodium or a sodium atom;
and wherein the fluxing agent is a molybdenum compound.

* * * * *